(12) United States Patent
Pan et al.

(10) Patent No.: US 9,516,583 B2
(45) Date of Patent: Dec. 6, 2016

(54) METHOD AND DEVICE FOR OBTAINING DUPLEX MODE INFORMATION OF USER EQUIPMENT

(75) Inventors: Xueming Pan, Beijing (CN); Jinling Hu, Beijing (CN); Guojun Xiao, Beijing (CN); Jie Zhang, Beijing (CN); Libo Wang, Beijing (CN); Deshan Miao, Beijing (CN); Yu Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 751 days.

(21) Appl. No.: 13/508,897

(22) PCT Filed: Oct. 22, 2010

(86) PCT No.: PCT/CN2010/001668
§ 371 (c)(1),
(2), (4) Date: Jun. 8, 2012

(87) PCT Pub. No.: WO2011/057470
PCT Pub. Date: May 19, 2011

(65) Prior Publication Data
US 2012/0243448 A1 Sep. 27, 2012

(30) Foreign Application Priority Data
Nov. 10, 2009 (CN) .......................... 2009 1 0237190

(51) Int. Cl.
| | |
|---|---|
| H04W 48/16 | (2009.01) |
| H04W 48/08 | (2009.01) |
| H04W 74/08 | (2009.01) |
| H04W 76/02 | (2009.01) |
| H04W 88/06 | (2009.01) |

(Continued)

(52) U.S. Cl.
CPC ............. *H04W 48/16* (2013.01); *H04W 48/08* (2013.01); *H04W 48/12* (2013.01); *H04W 74/0833* (2013.01); *H04W 76/02* (2013.01); *H04W 88/06* (2013.01); *H04W 88/08* (2013.01)

(58) Field of Classification Search
None
See application file for complete search history.

(56) References Cited

U.S. PATENT DOCUMENTS

| 6,983,147 B1 * | 1/2006 | Hans et al. ................... 370/331 |
| 7,962,161 B1 * | 6/2011 | Giallorenzi et al. .......... 455/466 |

(Continued)

FOREIGN PATENT DOCUMENTS

| CN | 1466286 A | 1/2004 |
| CN | 101507348 A | 8/2009 |

(Continued)

OTHER PUBLICATIONS

3GPP TSG RAN1 TDD Adhoc, Beijing, China. R1-071856, Apr. 17-Apr. 20, 2007, 3 pages.

*Primary Examiner* — Chirag Shah
*Assistant Examiner* — Joshua Smith
(74) *Attorney, Agent, or Firm* — Kilpatrick Townsend & Stockton LLP

(57) ABSTRACT

A method and device for acquiring user equipment duplex mode information are disclosed by the present invention, wherein, the method includes: the user equipment establishes a radio resource control connection with a base station, and reports the user equipment duplex mode information when establishing the radio resource control connection. With the technical scheme provided in the embodiments of the present invention, the network side acquires the duplex mode of the user equipment.

6 Claims, 7 Drawing Sheets

(51) Int. Cl.
*H04W 88/08* (2009.01)
*H04W 48/12* (2009.01)

(56) References Cited

U.S. PATENT DOCUMENTS

| | | | |
|---|---|---|---|
| 2001/0027105 A1* | 10/2001 | Moulsley | H04W 74/002 |
| | | | 455/450 |
| 2004/0252659 A1* | 12/2004 | Yun et al. | 370/328 |
| 2006/0025165 A1* | 2/2006 | Tillet et al. | 455/517 |
| 2006/0126558 A1* | 6/2006 | Lee et al. | 370/329 |
| 2006/0183428 A1* | 8/2006 | Heo et al. | 455/67.11 |
| 2007/0268848 A1* | 11/2007 | Khandekar et al. | 370/295 |
| 2008/0310358 A1* | 12/2008 | Shaheen | 370/329 |
| 2008/0316947 A1 | 12/2008 | Lindoff et al. | |
| 2009/0067352 A1* | 3/2009 | Wang | 370/280 |
| 2010/0027486 A1* | 2/2010 | Gorokhov et al. | 370/329 |
| 2010/0069084 A1* | 3/2010 | Parkvall et al. | 455/453 |
| 2010/0255867 A1* | 10/2010 | Ishii | H04J 11/0023 |
| | | | 455/501 |
| 2010/0290407 A1* | 11/2010 | Uemura | H04W 74/0866 |
| | | | 370/329 |
| 2010/0296451 A1* | 11/2010 | Li et al. | 370/328 |
| 2010/0329311 A1* | 12/2010 | Hannan | H04B 7/15535 |
| | | | 375/149 |
| 2011/0211503 A1* | 9/2011 | Che | H04L 5/0005 |
| | | | 370/280 |

FOREIGN PATENT DOCUMENTS

| | | |
|---|---|---|
| CN | 101527925 A | 9/2009 |
| EP | 2056613 A1 | 5/2009 |
| WO | 2007/020292 A1 | 2/2007 |
| WO | 2009036086 A1 | 3/2009 |

* cited by examiner

METHOD AND DEVICE FOR OBTAINING DUPLEX MODE INFORMATION OF USER EQUIPMENT

FIELD OF THE INVENTION

The present application is a US National Stage of International Application No. PCT/CN2010/001668, filed 22 Oct. 2010, designating the United States, and claiming priority to Chinese Patent Application No. 200910237190.8 filed Nov. 10, 2009.

BACKGROUND OF THE INVENTION

For a cellular mobile communication system, a duplex mode refers to a multiplexing mode of an uplink and a downlink; and for a mobile communication device (a base station or a UE), a duplex mode refers to a multiplexing mode of transmission and reception links. Time Division Duplex (TDD) and Frequency Division Duplex (FDD) are two general duplex modes in transmission of radio communication, and both the TDD mode and the FDD mode are supported concurrently in a Long Term Evolution (LTE) system. In the TDD mode, uplink and downlink signals are transmitted respectively in an uplink and a downlink at different intervals of time; and in the FDD mode, uplink and downlink signals are transmitted respectively in an uplink and a downlink over different operating frequency bands. Reference can be made to FIG. 1 and FIG. 2 for a duplex mode, where FIG. 1 is a schematic principle diagram of a duplex mode, and FIG. 2 is a schematic diagram of time and frequency relationships in the general duplex modes, and in FIG. 2, T represents transmission and R represents reception.

For the general duplex modes adopted in a cellular system: in the TDD mode, uplink and downlink signals are transmitted respectively in an uplink and a downlink with a Guard Period (GP) therebetween over the same operating frequency band at different intervals of time; and in the FDD mode, uplink and downlink signals can be transmitted respectively in an uplink and a downlink with a Guard Band therebetween over different frequency carriers over different operating frequency bands at the same time.

In a general TDD cellular mobile communication system, a mobile communication device (including a base station or a UE) also operates in the TDD mode, and a transmission and reception changeover switch is required in the device; and in a general FDD cellular mobile communication system, a mobile communication device (including a base station or a UE) also operates in the FDD mode, and a transmission and reception duplex filter is required in the device.

In an LTE system, a frame structure adopted for the FDD mode differs from that for the TDD mode, and they will be described particularly below:

FIG. 3 is a schematic diagram of a frame structure of an LTE FDD system, and as illustrated in FIG. 3, a radio frame with a length of 10 ms includes ten sub-frames, each including two time slots of 0.5 ms in the frame structure of the LTE FDD system, where Ts represents a sampling interval.

FIG. 4 is a schematic diagram of a somewhat more complex frame structure of an LTE TDD system, and as illustrate in FIG. 4, a radio frame which is also with a length of 10 ms can include one or two special sub-frames divided into three time slots: a Downlink Pilot Time Slot (DwPTS), a GP and an Uplink Pilot Time Slot (UpPTS). A sub-frame 0, a sub-frame 5 and the DwPTS are always used for downlink transmission, and other sub-frames can be used for uplink transmission or downlink transmission as needed.

The lengths of the three time slots in a special sub-frame are configured as depicted in Table 1 below showing all configuration schemes of the region of a special sub-frame.

TABLE 1

Configurations of a special sub-frame in an LTE TDD system

| Sequence number of configuration | Short CP | | | Extended CP | | |
|---|---|---|---|---|---|---|
| | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

For the structure of frame in the LTE TDD system, another important category of configurations are configurations of uplink and downlink sub-frames, and specific configuration schemes are as depicted in Table 2 below listing seven configurations, where D represents a sub-frame for downlink transmission, U represents a sub-frame for uplink transmission, and S represents a special sub-frame including three parts of DwPTS, GP and UpPTS.

TABLE 2

Configurations of uplink and downlink sub-frames in an LTE TDD system

| Sequence number of configuration | Switching period | Sequence number of sub-frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A PCFICH (Physical Control Format Indicator Channel), a PDCCH (Physical Downlink Control Channel), PHICH (Physical HARQ Indicator Channel), PDSCH (Physical Downlink Shared Channel) and a PSS (Primary Synchronization Signal) can be transmitted in the DwPTS field, and a PRACH (Physical Random Access Channel) and SRS (Sounding Reference Signal) but neither a PUSCH (Physical Uplink Shared Channel) nor a PUCCH (Physical Uplink Control Channel) can be transmitted in the field UpPTS.

A drawback in the prior art lies in that a technical solution enabling a duplex mode of a UE to be known at the network side is absent so far in a communication system.

SUMMARY OF THE INVENTION

A technical problem to be addressed by the invention is to provide a method and device for obtaining duplex mode information of a UE.

An embodiment of the invention provides a method for obtaining duplex mode information of a UE, which includes:

a base station configuring mutually orthogonal sets of PRACH channel resources and/or mutually orthogonal sets of preambles for UE in a first type of duplex mode and UE in a second type of duplex mode;

the base station signaling configuration information including the configured mutually orthogonal sets of PRACH channel resources and/or mutually orthogonal sets of preambles to the UE in the first type of duplex mode and the UE in the second type of duplex mode in system broadcast;

the base station detecting a random access signal which a UE initiates after selecting one among the set of PRACH channel resources in compliance with the type of duplex mode of the UE and/or one among the set of preambles in compliance with the type of duplex mode of the UE upon knowledge of the configuration information; and the base station determining the type of duplex mode of the UE according to the PRACH channel resource and/or the preamble of the detected random access signal initiated from the UE.

An embodiment of the invention provides a base station including:

a configuring module configured to configure mutually orthogonal sets of PRACH channel resources and/or mutually orthogonal sets of preambles for UE in a first type of duplex mode and UE in a second type of duplex mode;

a broadcasting module configured to signal configuration information including the configured mutually orthogonal sets of PRACH channel resources and/or mutually orthogonal sets of preambles to the UE in the first type of duplex mode and the UE in the second type of duplex mode in system broadcast;

a detecting module configured to detect a random access signal which a UE initiates after selecting one among the set of PRACH channel resources in compliance with the type of duplex mode of the UE and/or one among the set of preambles in compliance with the type of duplex mode of the UE upon knowledge of the configuration information; and a determining module configured to determine the type of duplex mode of the UE according to the PRACH channel resource and/or the preamble of the detected random access signal initiated from the UE.

An embodiment of the invention provides a user equipment including:

a receiving module configured to receive system broadcast information transmitted from a base station including configuration information of mutually orthogonal sets of PRACH channel resources and/or mutually orthogonal sets of preambles which the base station configures for UE in a first type of duplex mode and a UE in a second type of duplex mode; and a transmitting module configured to select one among the set of PRACH channel resources in compliance with the type of duplex mode of the UE and/or one among the set of preambles in compliance with the type of duplex mode of the UE upon knowledge of the configuration information and then initiate a random access signal.

An embodiment of the invention provides a method for obtaining duplex mode information of a UE, which includes:

a base station allocating an uplink transmission resource for a resource scheduling request to be initiated from a UE by transmitting a random access response message to the UE in an random access process; and the base station receiving information on the duplex mode of the UE reported from the UE over the allocated uplink transmission resource.

An embodiment of the invention provides a base station including:

a responding module configured to allocate an uplink transmission resource for a resource scheduling request to be initiated from a UE by transmitting a random access response message to the UE in an random access process; and a receiving module configured to receive information on the duplex mode of the UE reported from the UE over the allocated uplink transmission resource.

An embodiment of the invention provides a user equipment including:

a mode determining module configured to determine the duplex mode adopted for the UE;

a reporting module configured to report information on the duplex mode over an uplink transmission resource allocated at the network side, An embodiment of the invention provides a method for obtaining duplex mode information of a UE, which includes:

a UE establishing an RRC connection with a base station; and the UE reporting information on the duplex mode of the UE upon establishment of the RRC connection.

An embodiment of the invention provides a user equipment including:

a mode determining module configured to determine the duplex mode adopted for the UE; and a reporting module configured to report information on the duplex mode upon establishment of an RRC connection.

An advantageous effect of the invention is as follows:

A duplex mode of a UE can be known at the network side by the technical solutions according to the embodiments of the invention.

DETAILED DESCRIPTION OF THE EMBODIMENTS

Figure 1:
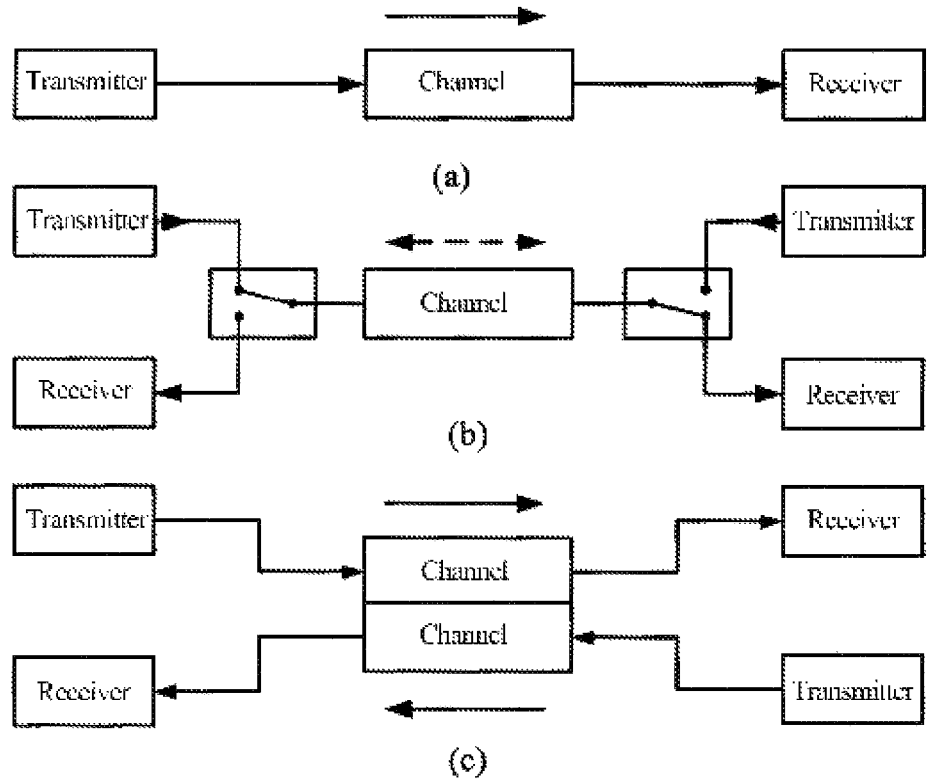
FIG. 1(a)-(c) are schematic principle diagrams of duplex modes in the prior art.
Figure 2:
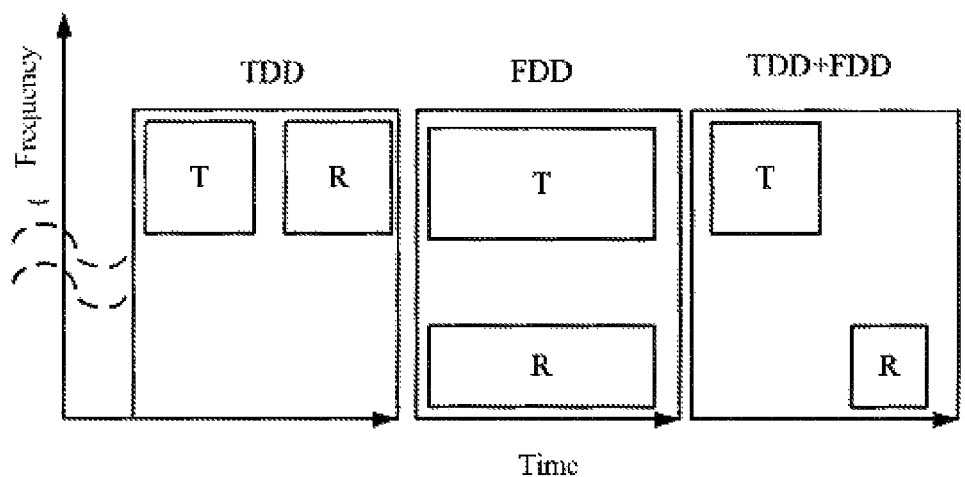
FIG. 2 is a schematic diagram of time and frequency relationships in the general duplex modes in the prior art.
Figure 3:
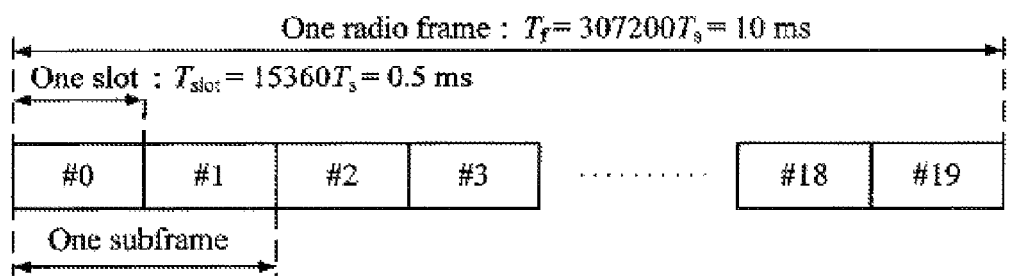
FIG. 3 is a schematic diagram of a structure of frame in an LTE FDD system in the prior art.
Figure 4:
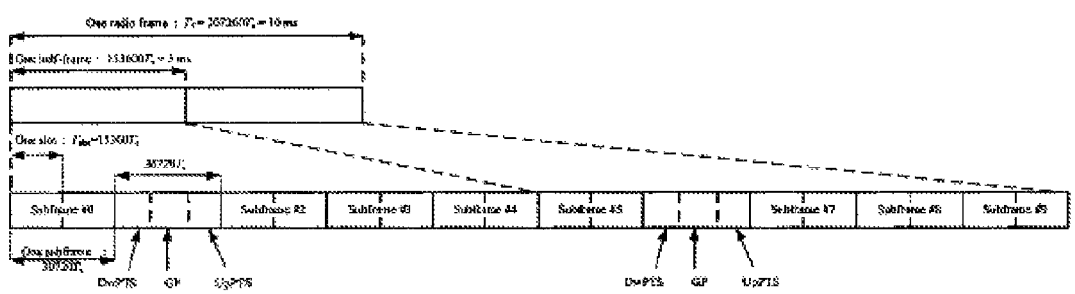
FIG. 4 is a schematic diagram of a structure of frame in an LTE TDD system in the prior art.

The inventors of the invention have noticed during the process of the invention that another difference between the FDD mode and the TDD mode in the LTE in addition to the difference in terms of a frame structure primarily lies in the difference between the duplex modes themselves, that is, consecutive sub-frames are used for operation in the FDD mode while uplink or downlink sub-frames are temporally inconsecutive in the TDD mode, thus resulting in some differences in terms of uplink and downlink scheduling and retransmission timings and control processes. However FDD is the same as TDD in term of other general transmission technologies, and this also provides a condition for further integrating both of them. Technical solutions according to embodiments of the invention primarily aim at a method for integrating FDD and TDD, that is, both an access of an FDD UE and that of a TDD UE are supported concurrently over a pair of TDD carriers with some characteristics, and in order to achieve such a hybrid access scheme (that is, a hybrid access of an FDD UE and a TDD UE is enabled in a system) and also enable a base station to schedule an appropriate sub-frame resource according to a duplex mode of a UE, it is crucial to enable the base station to know duplex mode information of the UE. That is, the duplex mode of the UE can be provided so that the communication system supporting both FDD and TDD can make selection so as to provide a better communication service. The embodiments of the invention will be described below with reference to the drawings.

Two types of random accesses are defined in a LTE system: a contention-based random access and a contention-free random access. A flow of a contention-based random access is as follows:

1. A UE searches for a cell and then reads broadcast information to obtain a PRACH channel resource configuration and a preamble configuration from the broadcast information.

2. The UE transmits a preamble which can identify its identity over a time and frequency resource of a specific PRACH channel selected by an upper-layer algorithm to perform uplink synchronization.

3. A base station detects a preamble over the corresponding time and frequency resource and transmits a random access response after detecting the preamble.

4. The UE detects a random access response transmitted from the base station for a subsequent period of time after transmitting the preamble.

5. The UE detects its own random access response and then transmits a resource scheduling request according to the contents in the response and its demand for a data service.

6. The base station transmits a response according to the practical load condition upon reception of the scheduling request. A confliction resolution response is transmitted in the case of confliction.

In the LTE system, a random access preamble is borne over a physical layer PRACH channel, and one or more consecutive uplink sub-frames in the time domain and six Physical Resource Blocks (PRBs) in the frequency domain are occupied for each PRACH channel. One or more PRACH channels can be configured in the system dependent upon design demands of the system, e.g., an access load, an access delay, etc., and these PRACH channels can be configured in different uplink sub-frames or over non-overlapping PRACH resources in the same uplink sub-frame.

Hereupon an embodiment of the invention provides a solution for obtaining duplex mode information of a UE, which will be described below.

Figure 5:
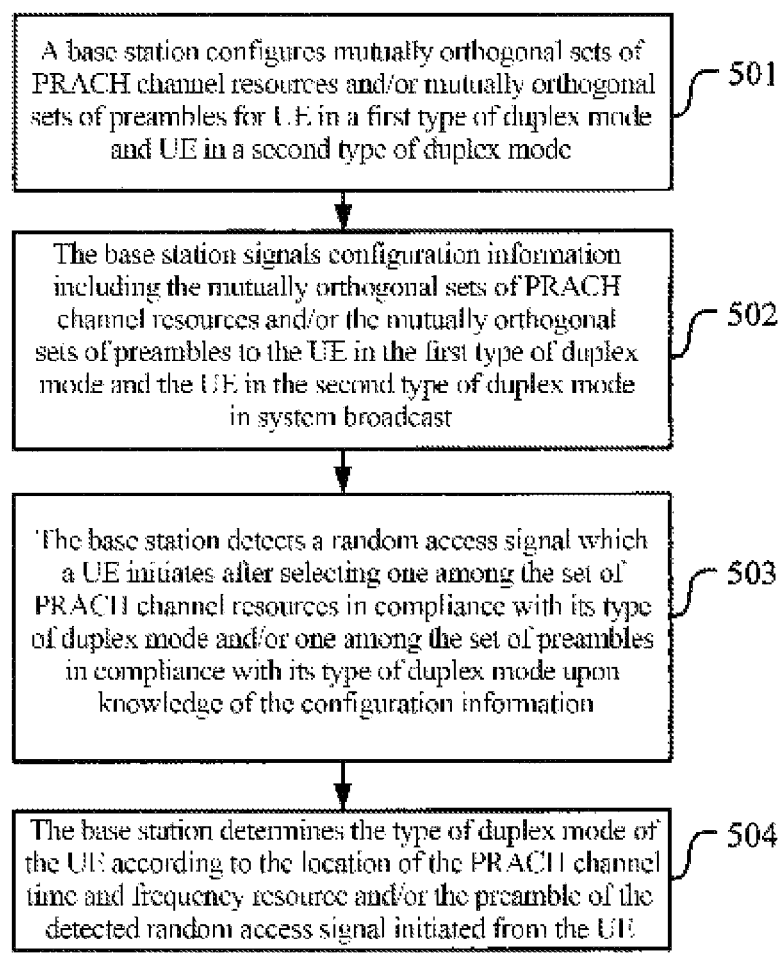
FIG. 5 is a schematic flow diagram of a first embodiment of a method for obtaining duplex mode information of a UE according to the invention.

FIG. 5 is a schematic flow diagram of a first method for obtaining duplex mode information of a UE, and as illustrated in FIG. 5, duplex mode information of a UE can be obtained in the following steps:

In the step 501, a base station configures mutually orthogonal sets of PRACH channel resources and/or mutually orthogonal sets of preambles for UE in a first type of duplex mode and UE in a second type of duplex mode;

In the step 502, the base station signals configuration information including the configured mutually orthogonal sets of PRACH channel resources and/or mutually orthogonal sets of preambles to the UE in the first type of duplex mode and the UE in the second type of duplex mode in system broadcast;

In the step 503, the base station detects a random access signal which a UE initiates after selecting one among the set of PRACH channel resources in compliance with the type of duplex mode of the UE and/or one among the set of preambles in compliance with the type of duplex mode of the UE upon knowledge of the configuration information; and In the step 504, the base station determines the type of duplex mode of the UE according to the location of the PRACH channel time and frequency resource and/or the preamble of the detected random access signal initiated from the UE.

In an implementation, the base station can configure the mutually orthogonal sets of PRACH channel resources and/or the mutually orthogonal sets of preambles for the UE in the first type of duplex mode and the UE in the second type of duplex mode over an uplink carrier enabling a hybrid access of the first type of duplex mode and the second type of duplex mode.

In an implementation, the mutually orthogonal sets of PRACH channel resources can be sets of PRACH channel resources including orthogonal resources in the time domain and/or orthogonal resources in the frequency domain.

In an implementation, the first type of duplex mode and the second type of duplex mode can be two different types of duplex modes selected from a group consisted of FDD, TDD and half-duplex FDD.

In a specific implementation, the base station configures the mutually orthogonal sets of PRACH channel resources and/or the mutually orthogonal sets of preambles for FDD UE and TDD UE over an uplink carrier enabling a hybrid access of the FDD UE and the TDD UE and signals the available sets of PRACH channel resources and/or sets of preambles respectively to the FDD UE and the TDD UE in the system broadcast;

Then the FDD UE or the TDD UE selects one among the set of PRACH channel resources in compliance with its type of duplex mode and/or one among the set of preambles in compliance with its type of duplex mode upon knowledge of the configuration information and initiates a random access; and Thus the base station can determine whether the accessing user equipment is an FDD UE or a TDD UE according to the location of the PRACH channel time and frequency resource and/or the preamble of the detected random access signal.

Figure 6:
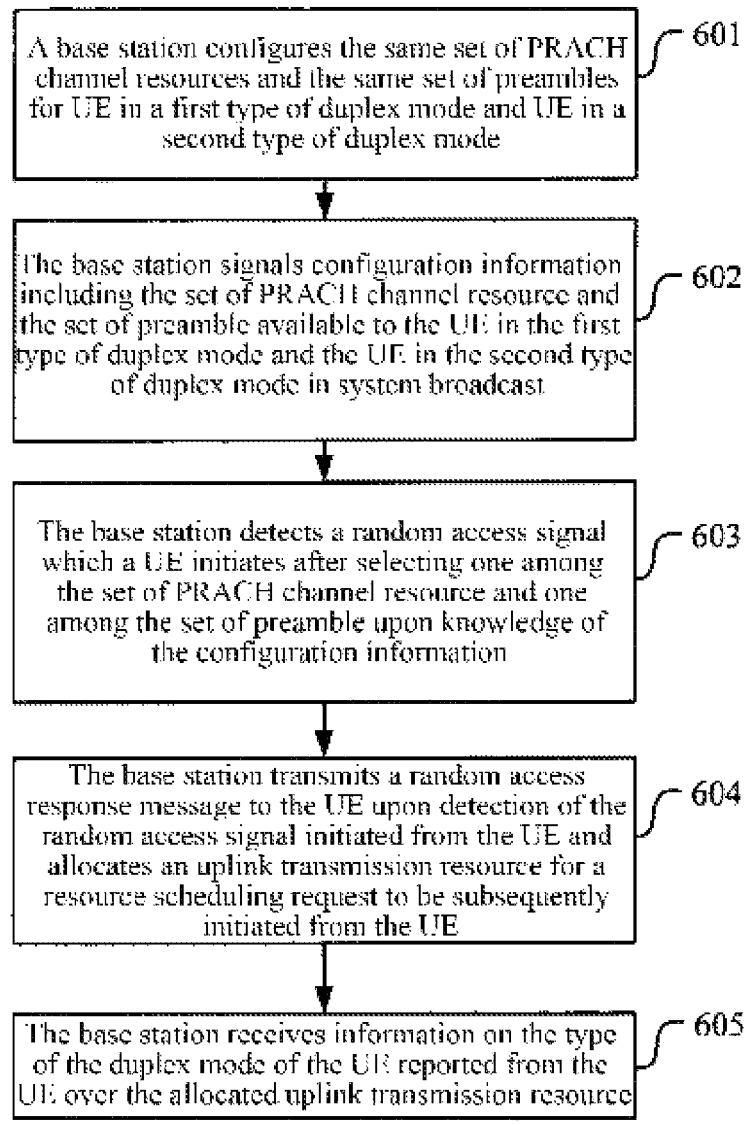
FIG. 6 is a schematic flow diagram of a second embodiment of the method for obtaining duplex mode information of a UE according to the invention.

FIG. 6 is a schematic flow diagram of a second method for obtaining duplex mode information of a UE, and as illustrated in FIG. 6, duplex mode information of a UE can be obtained in the following steps:

In the step 601, a base station configures the same set of PRACH channel resources and the same set of preambles for UE in a first type of duplex mode and UE in a second type of duplex mode;

In the step 602, the base station signals configuration information including the set of PRACH channel resource and the set of preamble available to the UE in the first type of duplex mode and the UE in the second type of duplex mode in system broadcast;

In the step 603, the base station detects a random access signal which a UE initiates after selecting one among the set of PRACH channel resource and one among the set of preamble upon knowledge of the configuration information;

In the step 604, the base station transmits a random access response message to the UE upon detection of the random access signal initiated from the UE and allocates an uplink transmission resource for a resource scheduling request to be subsequently initiated from the UE, where the base station transmits the random access response message to the UE in the first type of duplex mode in the same format of the random access response message transmitted to the UE in the second type of duplex mode; and In the step 605, the base station receives information on the type of the duplex mode of the UE reported from the UE over the allocated uplink transmission resource.

In an implementation, the first type of duplex mode and the second type of duplex mode can be two different types of duplex modes selected from a group consisted of FDD, TDD and half-duplex FDD.

In a specific implementation, the base station configures the same set of PRACH channel resources and the same set of preambles over an uplink carrier enabling the hybrid FDD and TDD access for FDD UE and TDD UE and signals the set of PRACH channel resources and the set of preambles to the whole user equipments (including the FDD UE and the TDD UE) in the system broadcast'

The FDD UE or the TDD UE can select one among the signaled set of PRACH channel resources and one among the set of preambles upon knowledge of the configuration information and initiates a random access;

Then the base station transmits a random access response message in the same format to each of the FDD UE and the TDD UE, and allocates an uplink transmission resource for a subsequent resource scheduling request of each UE; and Thus the UE can report information on its supported duplex mode, for example, in one bit, over the allocated uplink transmission resource.

In another implementation, the UE makes uplink synchronization and resource requests in a contention-based random access flow in an initial access process and establishes a Radio Resource Control (RRC) connection with the base station and reports capability information of the UE (including version information of the UE, priority information of the UE, etc.) in a subsequent process.

Hereupon an embodiment of the invention provides a solution to obtaining duplex mode information of a UE, which will be described below.

Figure 7:
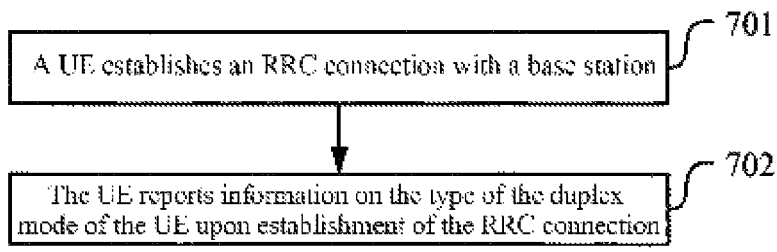
FIG. 7 is a schematic flow diagram of a third embodiment of the method for obtaining duplex mode information of a UE according to the invention.

FIG. 7 is a schematic flow chart of an implementation of a third method for obtaining duplex mode information of a UE, and as illustrated in FIG. 7, duplex mode information of a UE can be obtained in the following steps:

In the step 701, a UE establishes an RRC connection with a base station; and

In the step 702, the UE reports duplex mode information of the UE upon establishment of the RRC connection.

In a specific implementation, the base station and the UE can behave in an initial access process as in an existing system, but the UE reports the information on its supported duplex mode, for example, in one bit, upon establishment of the RRC connection with the base station.

In order to better understand a communication mode with which the technical solution of the invention can be combined, an adoptable communication solution capable of providing a communication service in a plurality of types of duplex modes will be described below.

Figure 8:
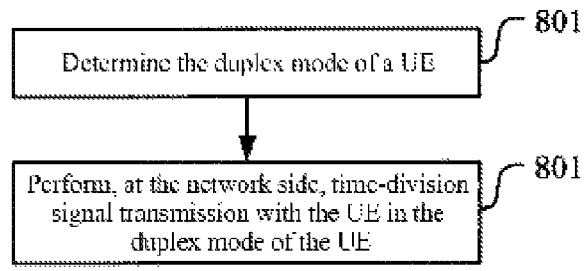
FIG. 8 is a schematic flow diagram of an implementation of a signal transmission method according to an embodiment of the invention.

FIG. 8 is a schematic flow diagram of an implementation of a signal transmission method, and as illustrated in FIG. 8, signal transmission can be performed in the following steps:

The step 801 is to determine a duplex mode of a UE; and

The step 802 is to perform, at the network side, time-division signal transmission with the UE in the duplex mode of the UE.

In an implementation, time-division signal transmission can be performed with the UE in the duplex mode of the UE as follows;

Signal transmission is performed with the UE in the duplex mode of the UE over at least two nonconsecutive carriers with an interval of frequency satisfying a required interval of frequency between an uplink and a downlink of FDD.

In an implementation, the at least two nonconsecutive carriers can be at least two nonconsecutive TDD carriers.

The following description will be given taking FDD and TDD respectively as an example.

Figure 9:
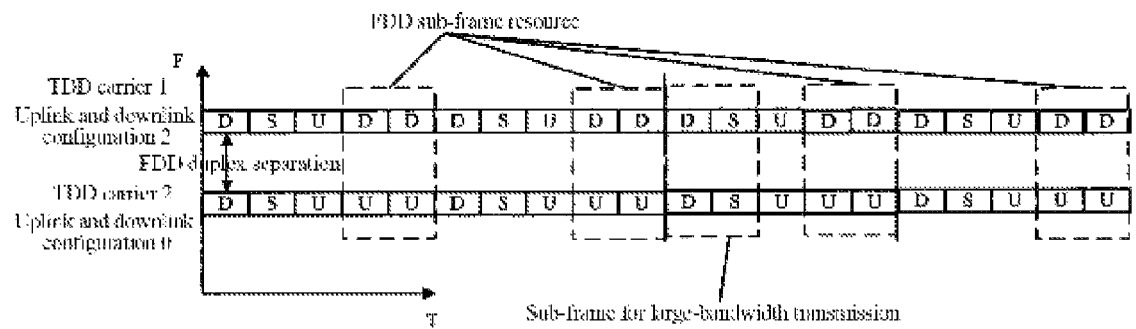
FIG. 9 is a schematic diagram of resource allocation in signal transmission in a hybrid FDD/TDD mode according to an embodiment of the invention.

FIG. 9 is a schematic diagram of resource allocation in signal transmission in a hybrid FDD/TDD mode.

In an implementation, there are at least two nonconsecutive TDD carriers in a communication system, a TDD carrier 1 and a TDD carrier 2 as illustrated in FIG. 9, with an interval of frequency satisfying or above a required interval of frequency between an uplink and a downlink of FDD. In a specific implementation, this required interval of frequency between an uplink and a downlink of FDD can be as defined in an existing radio frequency index or a radio frequency index refined following an improved level of device some time in the future.

Furthermore, there are also possibly included:

One or more TDD carriers for signal transmission with the UE; and/or

One or more FDD carriers for signal transmission with the UE.

That is, there are also possibly one or more other TDD carriers and/or one or more other FDD carriers (a unidirectional FDD carrier, e.g., a downlink carrier or an uplink carrier, or a pair of FDD carriers, i.e., an uplink carrier and a downlink carrier) in the communication system.

In an implementation, each pair of nonconsecutive TDD carriers can be configured with different allocation schemes of uplink and downlink sub-frames.

For example, two non-consecutive TDD carriers can be configured with different allocation schemes of uplink and downlink sub-frames, and as illustrated in FIG. 9, the TDD carrier 1 is configured with an allocation scheme 2 of uplink and downlink sub-frame, and the TDD carrier 2 is configured with an allocation scheme 0 of uplink and downlink sub-frame.

In an implementation, sub-frames of each pair of TDD carriers can be asynchronous, and a temporal offset between the sub-frames is an integer multiple of the length of sub-frame.

For example, sub-frames of two TDD carriers can also be asynchronous, but a temporal offset is an integer multiple of the length of sub-frame.

In an implementation, sub-frames of each pair of TDD carriers are asynchronous, and each pair of TDD carriers are configured with the same uplink and downlink allocation scheme; or Sub-frames of each pair of TDD carriers are synchronous, and each pair of TDD carriers are configured with different uplink and downlink allocation schemes; or Sub-frames of each pair of TDD carriers are asynchronous, and each pair of TDD carriers are configured with different uplink and downlink allocation schemes; or For example, the following possibilities of the two TDD carriers in FIG. 9 also exist without departing from the solutions according to the embodiments of the invention.

A) The two TDD carriers are asynchronous, and the two TDD carriers are configured with the same uplink and downlink allocation scheme;

B) The two TDD carriers are synchronous, and the two TDD carriers are configured with different uplink and downlink allocation schemes; or C) The two TDD carriers are asynchronous, and the two TDD carriers are configured with different uplink and downlink allocation schemes.

In an implementation, any one of the carriers can be scheduled for use by an LTE TDD UE or LTE-A TDD UE with a single-carrier; or Sub-frame resources configured in the same transmission direction over at least two carriers can be scheduled concurrently for use by an LTE-A TDD UE which shall support large-bandwidth transmission; or Sub-frame resources configured in different transmission direction over at least two carriers can be scheduled concurrently for use by an LTE-A TDD UE capable of concurrent transmission and reception over the two carriers.

For the foregoing two TDD carriers, any sub-frame resource over each carrier can be scheduled for use by a TDD UE. For example, A) sub-frame resources over a single carrier can be provided for use by any TDD UE;

B) Sub-frame resources configured in the same transmission direction over the two carriers can be scheduled concurrently for use by an LTE-A TDD UE which shah support large-bandwidth transmission; or Sub-frame resources configured in different transmission direction over the two carriers can be scheduled concurrently for use by an LTE-A TDD UE capable of concurrent transmission and reception over the two carriers (concurrent reception over one of the carrier and transmission over the other carrier).

In an implementation, sub-frame resources configured in opposite transmission direction over two carriers can be scheduled concurrently for use by an FDD UE.

For example, for the foregoing two TDD carriers, sub-frame resources configured in opposite transmission direction over the two carriers can be scheduled concurrently for use by an FDD UE.

In an implementation, an FDD UE can be configured in a DRX status when sub-frame resources configured in the same transmission direction over two carriers to thereby lower power consumption of the UE.

Based upon the same inventive idea, embodiments of the invention further provide a base station and a user equipment, and since these devices address the problem under a principle similar to that of the method for obtaining duplex mode information of a UE, reference can be made to the implementations of the method for implementations of these device, and a repeated description thereof will be omitted here.

Figure 10:
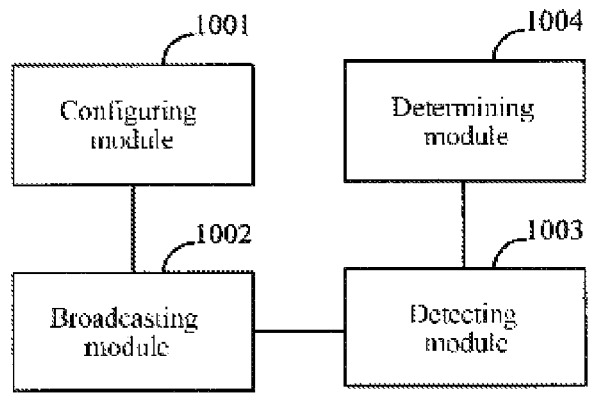
FIG. 10 is a schematic structural diagram of a first base station according to an embodiment of the invention.

FIG. 10 is a schematic structural diagram of a first base station, and as illustrated, the base station can include:

A configuring module 1001 configured to configure mutually orthogonal sets of PRACH channel resources and/or mutually orthogonal sets of preambles for UE in a first type of duplex mode and UE in a second type of duplex mode;

A broadcasting module 1002 configured to signal configuration information including the configured mutually orthogonal sets of PRACH channel resources and/or mutually orthogonal sets of preambles to the UE in the first type of duplex mode and the UE in the second type of duplex mode in system broadcast;

A detecting module 1003 configured to detect a random access signal which a UE initiates after selecting one among the set of PRACH channel resources in compliance with its type of duplex mode and/or one among the set of preambles in compliance with its type of duplex mode upon knowledge of the configuration information; and A determining module 1004 configured to determine the type of duplex mode of the UE according to the PRACH channel resource and/or the preamble of the detected random access signal initiated from the UE.

In an implementation, the configuring module can be further configured to can configure the mutually orthogonal sets of PRACH channel resources and/or the mutually orthogonal sets of preambles over an uplink carrier enabling a hybrid access of the first type of duplex mode and the second type of duplex mode for the UE in the first type of duplex mode and the UE in the second type of duplex mode.

In an implementation, the configuring module can be further configured to configure the mutually orthogonal sets of PRACH channel resources as sets of PRACH channel resources including orthogonal resources in the time domain and/or orthogonal resources in the frequency domain.

In an implementation, the first type of duplex mode and the second type of duplex mode can be two different types of duplex modes selected from a group consisted of FDD, TDD and half-duplex FDD.

Figure 11:
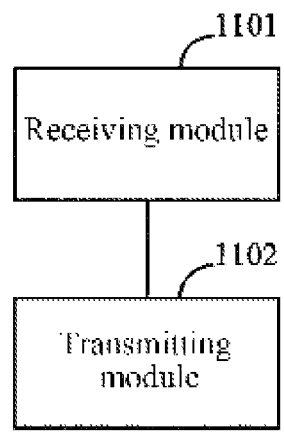
FIG. 11 is a schematic structural diagram of a first user equipment according to an embodiment of the invention.
Figure 12:
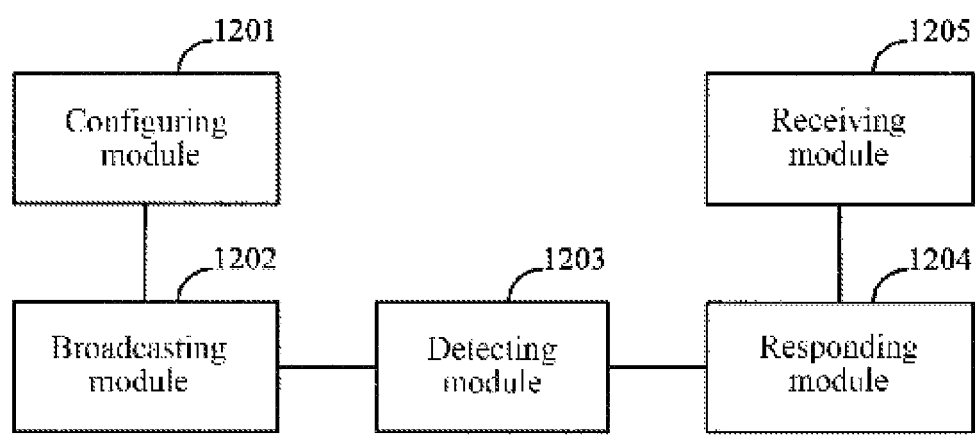
FIG. 12 is a schematic structural diagram of a second base station according to an embodiment of the invention.

FIG. 11 is a schematic structural diagram of a first user equipment, and as illustrated, the UE can include:

A receiving module 1101 configured to receive system broadcast information transmitted from a base station including configuration information of mutually orthogonal sets of PRACH channel resources and/or mutually orthogonal sets of preambles which the base station configures for UE in a first type of duplex mode and UE in a second type of duplex mode; and A transmitting module 1102 configured to select one among the set of PRACH channel resources in compliance with the type of duplex mode of the UE and/or one among the set of preambles in compliance with the type of duplex mode of the UE upon knowledge of the configuration information and then initiate a random access signal FIG. 12 is a schematic structural diagram of a second base station, and as illustrated, the base station can include:

A configuring module 1201 configured to configure the same set of PRACH channel resources and the same set of preambles for UE in a first type of duplex mode and UE in a second type of duplex mode;

A broadcasting module 1202 configured to signals configuration information including the set of PRACH channel resource and the set of preamble configured for the UE in the first type of duplex mode and the UE in the second type of duplex mode in system broadcast;

A detecting module 1203 configured to detect a random access signal which a UE initiates after selecting one among the set of PRACH channel resource and one among the set of preamble upon knowledge of the configuration information;

A responding module 1204 configured to transmit a random access response message to the UE upon detection of the random access signal initiated from the UE (the base station transmits the random access response message to the UE in the first type of duplex mode in the same format of the random access response message transmitted to the UE in the second type of duplex mode) and to allocate an uplink transmission resource for a subsequent resource scheduling request of the UE; and A receiving module 1205 configured to receive information on the type of the duplex mode of the UE reported from the UE over the allocated uplink transmission resource.

In an implementation, the first type of duplex mode and the second type of duplex mode can be two different types of duplex modes selected from a group consisted of FDD, TDD and half-duplex FDD.

Figure 13:
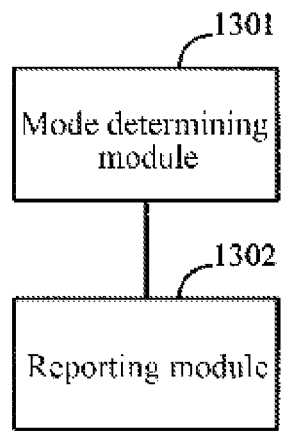
FIG. 13 is a schematic structural diagram of a second user equipment according to an embodiment of the invention.

FIG. 13 is a schematic structural diagram of a second user equipment, and as illustrated in FIG. 13, the UE can include:

A mode determining module 1301 configured to determine a duplex mode adopted for the UE;

A reporting module 1302 configured to report information on the type of the duplex mode over an uplink transmission resource allocated at the network side.

Figure 14:
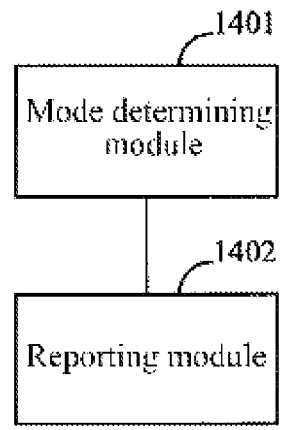
FIG. 14 is a schematic structural diagram of a third user equipment according to an embodiment of the invention.

FIG. 14 is a schematic structural diagram of a third user equipment, and as illustrated, the UE can include:

A mode determining module 1401 configured to determine a duplex mode adopted for the UE; and A reporting module 1402 configured to report information on the type of the duplex mode when an RRC connection is established.

In order to make better use of the technical solutions according to the embodiments of the invention, combination of any of the foregoing devices with the following network device and/or user equipment can also be conceived in an implementation and will be described below.

Figure 15:
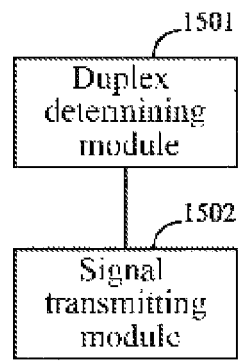
FIG. 15 is a schematic structural diagram of a network device according to an embodiment of the invention.

FIG. 15 is a schematic structural diagram of a network device, and as illustrated, the network device can include:

A duplex determining module 1501 configured to determine a duplex mode of a UE; and A signal transmitting module 1502 configured to perform time-division signal transmission with the UE in the duplex mode of the UE.

In an implementation, the signal transmission module can be further configured to perform time-division signal transmission with the UE in the duplex mode of the UE by performing signal transmission with the UE in the duplex mode of the UE over at least two nonconsecutive carriers with an interval of frequency satisfying a required interval of frequency between an uplink and a downlink of FDD.

In an implementation, the at least two nonconsecutive carriers adopted by the signal transmission module are at least two nonconsecutive TDD carriers.

In an implementation, the signal transmission module can be further configured to perform signal transmission with the UE over one or more other TDD carriers and/or to perform signal transmission with the UE one or more other FDD carriers.

In an implementation, the signal transmission module can be further configured to configure each pair of nonconsecutive TDD carriers with different allocation schemes of uplink and downlink sub-frames In an implementation, the signal transmission module can be further configured to cause sub-frames of each pair of TDD carriers to be asynchronous, wherein a temporal offset between the sub-frames is an integer multiple of the length of sub-frame.

In an implementation, the signal transmission module can be further configured to cause sub-frames of each pair of TDD carriers to be asynchronous and configure each pair of TDD carriers with the same uplink and downlink allocation scheme; or to cause sub-frames of each pair of TDD carriers to be synchronous and configure each pair of TDD carriers with different uplink and downlink allocation schemes; or to cause sub-frames of each pair of TDD carriers are asynchronous and configure each pair of TDD carriers with different uplink and downlink allocation schemes.

In an implementation, the signal transmission module can be further configured to schedule any of the carriers for use by an LTE TDD UE or a single-carrier LTE-A TDD UE for use; or to schedule sub-frame resources configured in the same transmission direction over the at least two carriers concurrently for use by an LTE-A TDD UE which shall support large-bandwidth transmission; or to schedule sub-frame resources configured in different transmission direction over at least two carriers concurrently for use by an LTE-A TDD UE capable of concurrent transmission and reception over the two carriers.

In an implementation, the signal transmission module can be further configured to schedule sub-frame resources configured in opposite transmission direction over the two carriers concurrently for use by an FDD UE.

In an implementation, the signal transmission module can be further configured to an FDD UE in a DRX status when sub-frame resources configured in opposite directions are transmitted over the two carriers.

Figure 16:
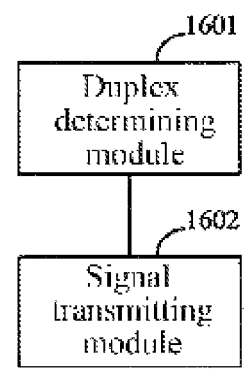
FIG. 16 is a schematic structural diagram of a user equipment according to an embodiment of the invention.

FIG. 16 is a schematic structural diagram of a user equipment, and as illustrated, the UE can include;

A duplex determining module 1601 configured to determine a duplex mode of the UE; and A signal transmitting module 1602 configured to perform time-division signal transmission with the network side in the duplex mode of the UE.

In an implementation, the signal transmitting module can be further configured to perform signal transmission with the network side in the FDD duplex mode of the UE over at least two nonconsecutive carriers with an interval of frequency satisfying a required interval of frequency between an uplink and a downlink of FDD and to perform signal transmission with the network side in the TDD duplex mode of the UE over any one or two carriers.

In an implementation, the at least two nonconsecutive carriers adopted by the signal transmitting module are at least two nonconsecutive TDD carriers.

In an implementation, the signal transmitting module can be further configured to perform signal transmission with the network side over one or more other TDD carriers and/or to perform signal transmission with the network side one or more other FDD carriers.

The respective parts of the foregoing devices have been functionally described as respective modules or units for the sake of a convenient description. Of course, the functions of the respective modules or units can be performed in the same one or more items of software or hardware in an implementation of the invention.

As can be apparent from the foregoing embodiments, a solution to obtaining the duplex mode of a UE is provided in the embodiments of the invention and particularly applicable to a system concurrently supporting an access of an FDD UE and that of a TDD UE in the event that it is necessary to identify the duplex mode of a UE and to perform a corresponding process, thereby effectively improve the efficiency of communication over a network.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and theft equivalents.

The invention claimed is:

1. A method for obtaining duplex mode information of a User Equipment, UE, comprising:
    a base station configuring a plurality of different mutually orthogonal sets of Physical Random Access Channel, PRACH, resources respectively for UE in a first type of duplex mode and UE in a second type of duplex mode, wherein locations in time and frequency of the orthogonal sets of PRACH resources for UE in a first type of duplex mode are different from locations in time and frequency of the orthogonal sets of PRACH resources for UE in a second type of duplex mode;
    the base station signaling configuration information comprising the locations in time and frequency of the configured plurality of different mutually orthogonal sets of PRACH channel resources to the UE in the first type of duplex mode and the UE in the second type of duplex mode in system broadcast;
    the base station detecting a random access signal which a UE initiates after selecting one among the set of PRACH channel resources in compliance with the type of duplex mode of the UE upon knowledge of the configuration information; and
    the base station determining the type of duplex mode of the UE according to the location in time and frequency of the PRACH channel resource of the detected random access signal initiated from the UE.

2. The method according to claim 1, wherein the base station configures the plurality of different mutually orthogonal sets of PRACH channel resources, over an uplink carrier enabling a hybrid access of the first type of duplex mode and the second type of duplex mode, respectively for the UE in the first type of duplex mode and the UE in the second type of duplex mode.

3. The method according to claim 1, wherein the plurality of different mutually orthogonal sets of PRACH channel resources are sets of PRACH channel resources comprising orthogonal resources in the time domain and/or orthogonal resources in the frequency domain.

4. The method according to claim 1, wherein the first type of duplex mode and the second type of duplex mode are two different types of duplex modes selected from a group consisted of FDD, TDD and half-duplex FDD.

5. The method according to claim 2, wherein the first type of duplex mode and the second type of duplex mode are two different types of duplex modes selected from a group consisted of FDD, TDD and half-duplex FDD.

6. The method according to claim 3, wherein the first type of duplex mode and the second type of duplex mode are two different types of duplex modes selected from a group consisted of FDD, TDD and half-duplex FDD.

\* \* \* \* \*